(12) United States Patent
Sasselli et al.

(10) Patent No.: US 7,317,448 B1
(45) Date of Patent: Jan. 8, 2008

(54) MULTIPLE SENSOR DEVICE AND METHOD

(75) Inventors: Nicolas Sasselli, Lausanne (CH); Olivier Egloff, Le Mont-sur-Lausanne (CH); Julien Piot, Rolle (CH); Bernhard Joss, Bussigny (CH); Olivier Theytaz, Pully (CH); Pascal Eichenberger, Lausanne (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 260 days.

(21) Appl. No.: 11/020,495

(22) Filed: Dec. 21, 2004

Related U.S. Application Data

(63) Continuation of application No. 09/969,433, filed on Oct. 1, 2001, now Pat. No. 6,847,353.

(51) Int. Cl.
*G09G 5/08* (2006.01)
(52) U.S. Cl. .......................... 345/166; 345/163; 345/165
(58) Field of Classification Search ........ 345/156–167, 345/169–173, 174–179; 178/18.01, 18.09
See application file for complete search history.

(56) References Cited

U.S. PATENT DOCUMENTS

| | | | | |
|---|---|---|---|---|
| 4,880,968 A | * | 11/1989 | Kwang-Chien | 250/221 |
| 2002/0093487 A1 | * | 7/2002 | Rosenberg | 345/166 |
| 2004/0017354 A1 | * | 1/2004 | Muranami | 345/156 |
| 2004/0227726 A1 | * | 11/2004 | Shahoian | 345/156 |

* cited by examiner

*Primary Examiner*—Richard Hjerpe
*Assistant Examiner*—Mansour M. Said
(74) *Attorney, Agent, or Firm*—The Law Office of Deepti Panchawagh-Jain

(57) ABSTRACT

A system, method, and method of manufacturing directed to an optical device with increased accuracy in tracking ability. The increased accuracy can be achieved by using a multiple sensor system. A second sensor is added to the optical device. The second sensor increases the probability of obtaining a high quality image. Thus, the tracking ability of the device can be performed with greater accuracy over a single sensor device. The second sensor can also perform additional functions.

30 Claims, 11 Drawing Sheets

MULTIPLE SENSOR DEVICE AND METHOD

RELATED APPLICATIONS

This application is a continuation application of U.S. patent application Ser. No. 09/969,433, now U.S. Pat. No. 6,847,353, filed Oct. 1, 2001, by the same inventors and entitled "Multiple Sensor Device And Method," to which priority is claimed and which is incorporated herein by reference in its entirety.

BACKGROUND

A. Technical Field

The present invention relates generally to optical technology, and more particularly, to optical input devices.

B. Background of the Invention

Optical technology is used in many contexts, including optical input devices, such as a mouse or a trackball, an optical printer advance mechanism, and an optical scanner. In most of these devices the optical system conventionally has a single sensor for determining the position of the optical device relative to some surface. For example, in the case of an optical mouse, the mouse has one optical sensor to determine the location of the mouse on a surface. Usually the surface is a desktop or mousepad. The position of the mouse on the surface corresponds to the position of the mouse pointer on a computer screen and the motion of the mouse on the surface translates to movement of the mouse pointer on the computer screen.

The movement of an optical mouse is determined by comparing two different images captured at two different moments in time and possibly two different locations on the surface. The ability of an optical mouse to track is highly dependent on the quality of the images. If the images are good quality, the optical mouse can more easily track.

On some surfaces an optical mouse can track well. However, there are some surfaces that present problems that the single sensor is not capable of overcoming and therefore not capable of translating the mouse motion to the mouse pointer movement. There are at least four problems with using a conventional optical mouse each of which is caused by the surface not being ideal for an optical sensor. These problems are: contrast, directionality, darkness, and an electronics problem.

The contrast problem is a result of having a glossy surface. A glossy surface lacks granularity and makes it difficult for the sensor to distinguish between a first image and a second image. The first and the second images are necessary for accurate tracking.

The directionality problem is caused by a surface being too directional, for example a wood surface. A directional surface is a surface with obvious directionality, for example, stripes or lines. On a directional surface the first image and the second image can look very similar even when motion has occurred. Most prior art optical sensors use an x-y Cartesian pixel implementation. In this implementation, the directionality problem is worse when the motion is in the 45 degrees direction relative to the directionality of the surface. Having the directionality of the stripes along the x-axis or y-axis can still cause problems, but having the directionality of the surface at a 45 degree angle to the x-axis or y-axis causes the greatest problem.

The darkness problem is caused by the surface being dark. When the surface is dark, more light is needed to get a high quality image. Since it takes more power to provide more light, there is a limit as to the amount of light that can reasonably be provided, especially in wireless optical devices. For example, providing more light requires greater power output. Wireless devices have limited power output due to power source constraints. Hence wireless devices may not be able to provide more light and the surface may still be relatively dark. When a surface is dark and there is not enough light, the images can be indistinguishable. Thus, the result can be poor tracking.

The electronics problem is caused by an automatic gain control (AGC) in the electronics of the optical device. The electronics can be set to react quickly between a very light surface and a very dark surface. When the AGC is set to react very quickly it can be unstable. Therefore, the speed of the AGC is decreased to eliminate the instability. However, once the speed has been reduced, the AGC is not capable of responding to a sudden change between a light and a dark surface. Thus, the tracking capability is adversely affected.

The problems discussed above are not limited to the optical mouse. Similar problems exist for a handheld scanner that uses an optical device to capture images and determine location and movement. Also, similar problems exist in a printer advance mechanism.

Accordingly it is desirable to provide an optical device that can sense location or movement on any surface. It is also desirable to overcome the problems of contrast, directionality, darkness, and electronics AGC.

SUMMARY OF THE INVENTION

The present invention provides a sensing system and method that can sense location and movement on most surfaces. It overcomes the above problems by adding at least one sensor in a different location from the first sensor. In one embodiment, only one sensor is added and may be referred to as a second sensor. The second sensor operates the same way the first sensor operates, by comparing images to determine location or movement. However, since the second sensor is in a second location, the image it senses can be different from the image sensed by the first sensor. Thus, the probability of one of the sensors having a good quality image is increased by having two sensors because although one image may not be of good enough quality, the other image may be of good enough quality. In one embodiment, one sensor has one magnification power and at least one of the other sensors has a different magnification power. Thus, further increasing the probability that at least one sensor will capture an image of good enough quality for tracking.

The present invention also uses a multiplexer to gather information from and about each sensor and select which sensor to use. In one embodiment, the multiplexer can select the first sensor. In another embodiment, the multiplexer can select the second sensor. In a third embodiment, the multiplexer can select a combination of the two sensors. In another embodiment, the mutliplexer can switch between one sensor, the other sensor, or the combination of sensors at any time.

As can be seen from the above description, the present invention may be applied to many different domains, and is not limited to any one application or domain. Many techniques of the present invention may be applied to an optical device in any domain.

DETAILED DESCRIPTION OF THE PREFERRED EMBODIMENTS

The following description of preferred embodiments of the present invention is presented in the context of a dual sensor device. However, in other embodiments of the invention there may be other numbers of sensors, greater than one. Although described with respect to an optical mouse, there are other optical devices that can use the present invention, for example, an optical scanner, an optical printer advance mechanism or an optical trackball. Different embodiments of the present invention are now described with reference to the figures where like reference numbers indicate identical or functionally similar elements. Also in the figures, the left most digit of each reference number corresponds to the figure in which the reference number is first used.

Figure 1A:
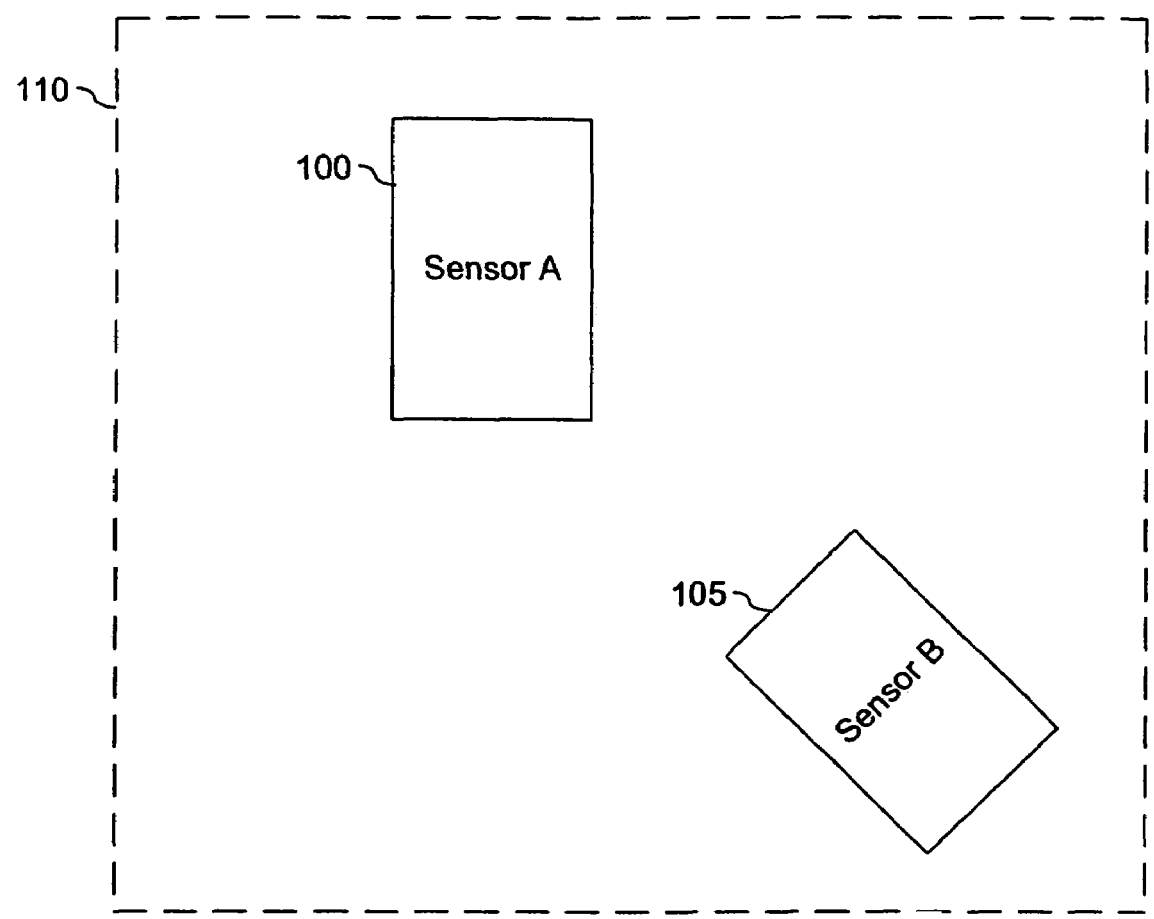
FIG. 1A is an illustration of a dual sensor system in accordance with one embodiment of the present invention.

Now referring to FIG. 1A, there is shown a diagram illustrating one embodiment of the present invention. Sensor A 100 and sensor B 105 are two optical sensors in an optical device 110. In the embodiment shown in FIG. 1A, optical device 110 can be comprised of sensor A 100 and sensor B 105. In another embodiment, more than two sensors could be implemented. In that embodiment, there would be a sensor C, sensor D, etc. not shown in FIG. 1A. In the embodiment show in FIG. 1, sensor B 105 is positioned at an angle relative to sensor A 100. In one embodiment, sensor B 105 is at a 45-degree angle to sensor A 100. Using only one sensor presents the problems discussed above. However, using two sensors increases the probability that one of the sensors will be able to obtain a high quality image and therefore sense motion of an optical device, for example an optical mouse. In one embodiment, sensor A 100 and sensor B 105 are positioned about 30 millimeters apart.

If sensor A 100 is on a glossy surface, a directional surface, a dark surface, or a surface with rapid changes from light to dark or dark to light, there is a possibility that sensor B 105 is not on a similar surface. Also, if sensor A is on a surface where sensing is difficult, there is a possibility that sensor B is not on such a surface. Therefore, adding a second sensor can increase the odds of having at least one sensor capable of obtaining a high quality image. Since the directionality problem is most problematic when moving at a 45-degree angle, the problem can be solved best by providing the second sensor at a 45-degree angle to the first sensor.

When at least one sensor can obtain a high quality image, then that sensor can be used to track movement. In one embodiment, two images captured by the sensor, which is capable of obtaining the highest quality image at two different moments in time, can be compared to obtain a change in position or a movement.

Additionally, in one embodiment, the second sensor could use a light source of a different wavelength from the first light source. For example, in an optical mouse the light source typically is a red light emitting diode ("LED"). Using a red LED makes it difficult to obtain a high quality image on a red light absorbing surface or a surface that offers a poor contrast when illuminated with red light. An LED of a different color increases the probability of accurate tracking capability on all color surfaces.

Figure 1B:
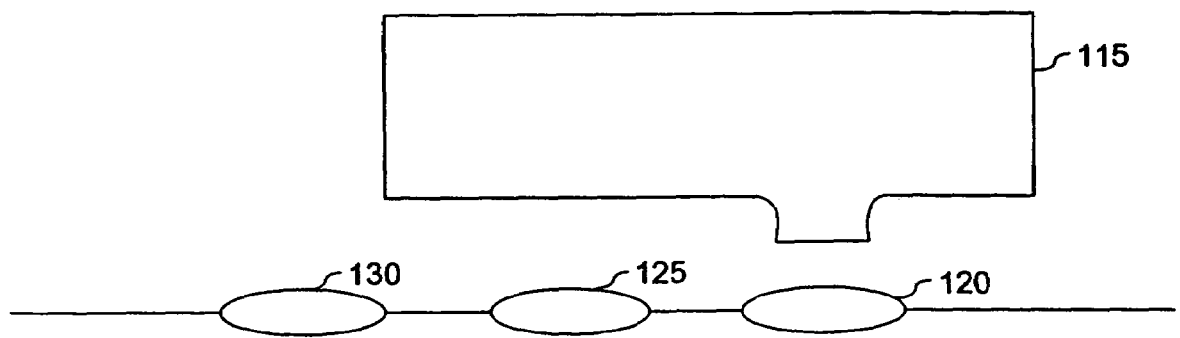
FIG. 1B is an illustration of a single sensor in a dual sensor system where lenses of different magnification can be used.

FIG. 1B illustrates one sensor in accordance with an embodiment of the present invention. In the embodiment shown, a magnification of the photosensor 115 can be changed by changing a lens placed in front of the photosensor 115. FIG. 1B shows a single sensor, although it is understood that the sensor shown in FIG. 1B could be any sensor, some sensors, or all sensors in a multiple sensor system. One or more of lenses 120, 125, and 130 can be placed in front of photosensor 115. Three lenses 120, 125, and 130 are shown, however, the embodiment is not limited to three lenses. There can be any number of lenses, one or more. In one embodiment a single lens is used. The single lens can change the magnification by having varying degrees of magnification across the lens. The magnification can change from one side of the lens to another or from top to bottom of the lens.

Figure 1C:
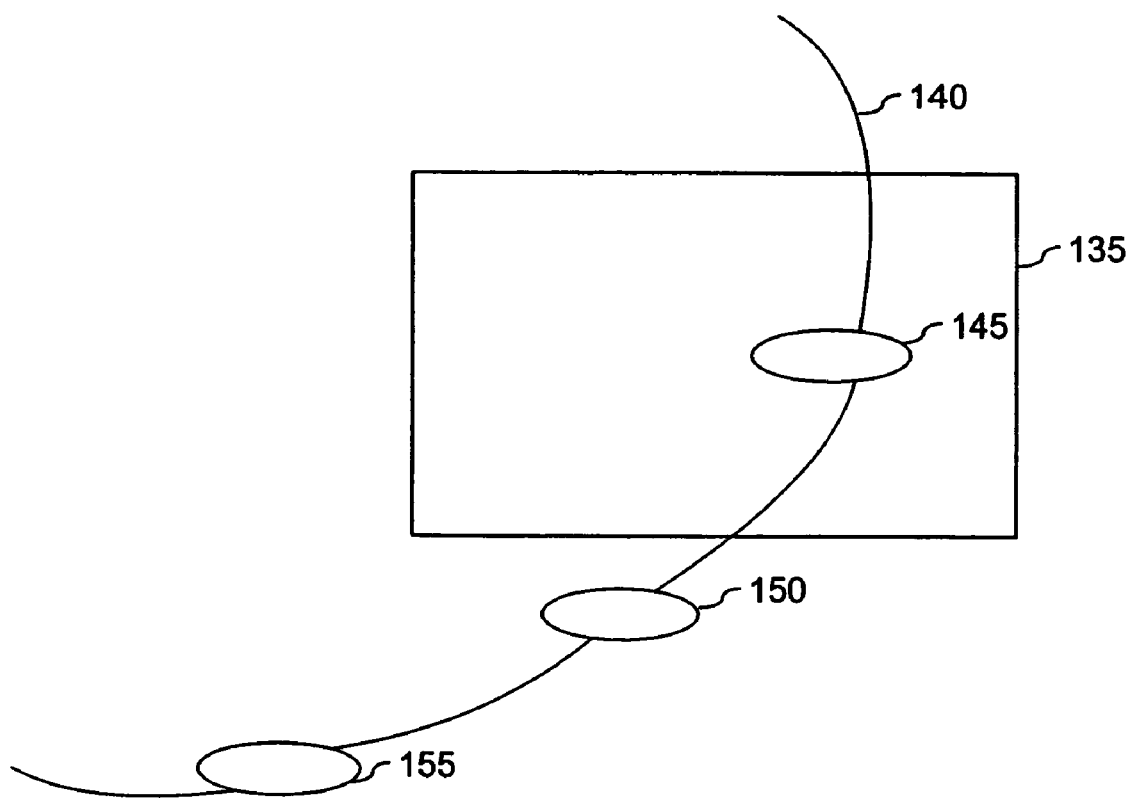
FIG. 1C is an illustration of a single sensor in a dual sensor system where a carousal of lenses can be used to change the magnification.

FIG. 1C illustrates one sensor in accordance with an alternate embodiment of the present invention. In the embodiment shown, a magnification of the photosensor 115 can be changed by changing the lens. In this embodiment, the lens is on a carousel of lenses 140. For example, in one embodiment, lenses 145, 150, and 155 are shown as successive lenses on a carousel. The magnification can be changed by rotating the carousel from one lens, for example lens 145, to another lens, for example lens 150. In this embodiment, although three lenses 145, 150, and 155 are shown, it is understood that any number of lenses can be configured on a carousel.

In any of the embodiments shown or described with reference to FIGS. 1B and 1C, the magnification of one sensor can be different from the magnification of at least one other sensor. The magnification can change the field of view. Thus, the two sensors can have different fields of view, with one field of view better for tracking than the other. By having different magnifications, the probability of having at least one sensor to obtain a high enough quality image for tracking increases. In one embodiment, the magnifications of the sensors is the same. In another embodiment, the magnifications can be different by any ratio that achieves the desired result of better tracking. For example, one sensor can have a reference magnification of 1 and another sensor can have a magnification from between 0.5 to 1.5.

In one embodiment, the magnification can be changed manually by a user. The manual switch used by the user can be implemented in software, hardware, or firmware. In another embodiment, the magnification can also be changed automatically by the multiple sensor device.

Figure 2:
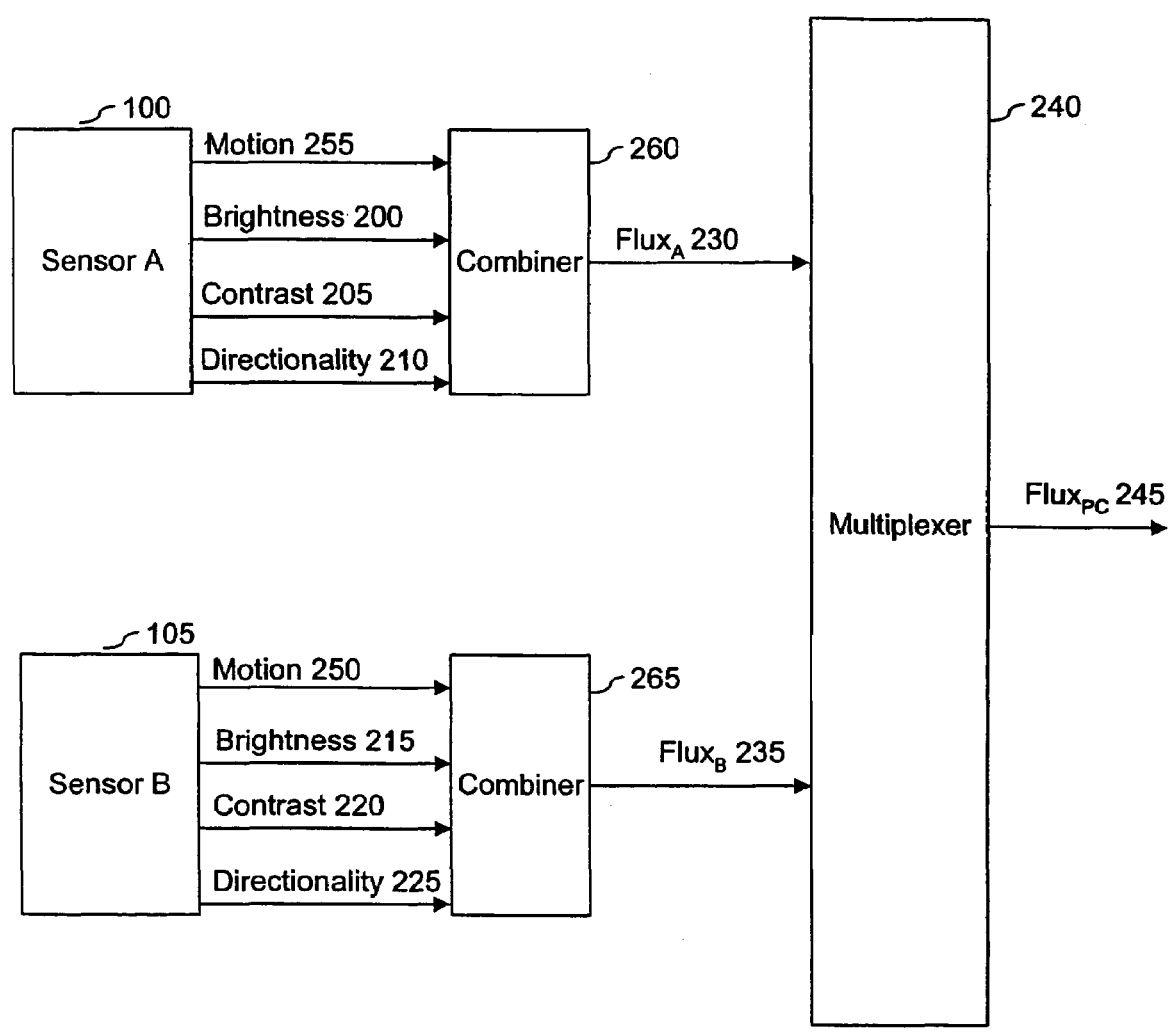
FIG. 2 is a block diagram illustrating the operation of the two sensors.

FIG. 2 illustrates a block diagram of the operation of the two sensors 100 and 105. FIG. 2 shows a multiplexer 240 and two sensors 100 and 105. Each of the two sensors have monitors for gathering data about the sensor. The data gathered can be used to determine how well a particular sensor is tracking.

In one embodiment, the data comprises brightness or darkness 200 and 215, contrast 205 and 220, directionality 210 and 225, and motion 250 and 255. It is understood that the term brightness shall refer to brightness, darkness, changes of brightness, and changes of darkness. In one embodiment, the brightness is a measure of the illumination on the sensor. In one embodiment, the contrast is a measure of surface quality. The surface quality is a measurement of the texture of the surface or the contrast of an image of the surface. For example, a glossy surface could have a contrast of zero. Directionality can be an identification of the amount of directionality on the surface, or an image of the surface. In one embodiment, other data can be detected by the sensor and used to determine how well a sensor is tracking.

Each of these measurements can be used to determine the tracking ability of each sensor. In addition to these measurements, each sensor can also measure the motion of the sensor. The motion 250 and 255 can be represented as a change in the x-direction and a change in the y-direction on an x-y coordinate plane. The motion 250 and 255 and the output from the monitors can be combined by combiners 260 and 265 into a measurement called flux 230 and 235. In one embodiment, a flux is determined for the first sensor, sensor A, called $flux_A$ 230. In one embodiment, another flux is determined for the second sensor, sensor B, called $flux_B$ 235. The two fluxes 230 and 235 can both be input into a multiplexer 240. The multiplexer can determine a $flux_{PC}$ 245 to be used by the optical device. In one embodiment, the optical device can be an optical mouse and the $flux_{PC}$ 245 can be a flux used by a computer indicating the movement of the optical mouse.

The multiplexer 245 uses a process to determine the $flux_{PC}$ 245. The process used by the multiplexer 240 can be either a static process or a dynamic process. A static process is an process where $flux_{PC}$ 245 is either $flux_A$ 230 or $flux_B$ 235 and where the sensor selection is made when the optical device is resting. A dynamic process is a process where $flux_{PC}$ 245 can be either $flux_A$ 230, $flux_B$ 235, or some combination of $flux_A$ 230 and $flux_B$ 235, and where the determination of $flux_{PC}$ 245 can be made at any time.

In one embodiment, $flux_{PC}$ 245 can be either $flux_A$ 230 or $flux_B$ 235. In another embodiment, $flux_{PC}$ 245 can be some combination of $flux_A$ 230 and $flux_B$ 235. For example, one such combination is a mean of $flux_A$ 330 and $flux_B$ 235. In one embodiment, the process used by the multiplexer 240 can be based on brightness 200 and 215, contrast 205 and 220, directionality 210 and 225, or any other data gather by the sensors.

Figure 3:
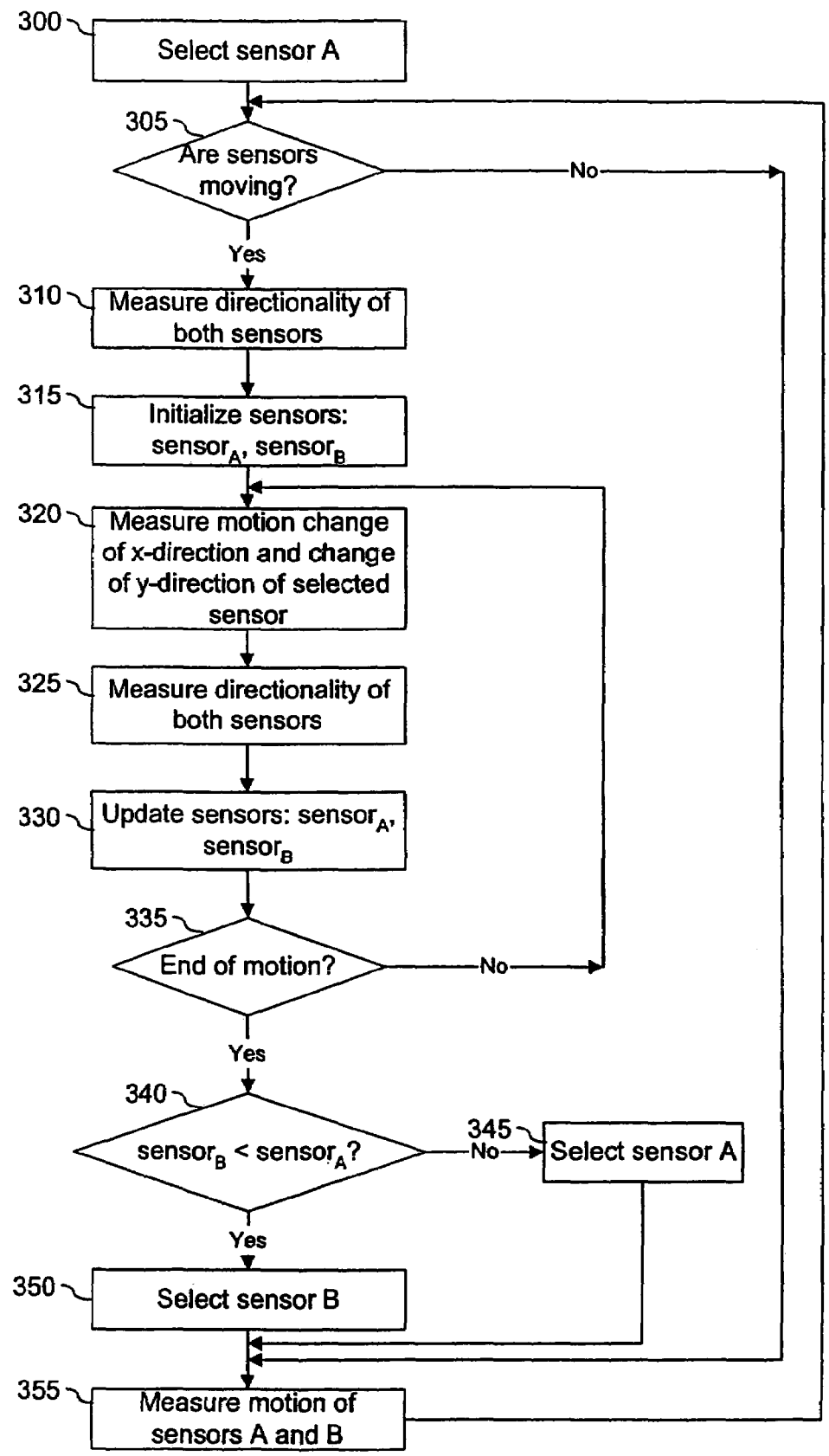
FIG. 3 is a flow diagram illustrating one embodiment of a static process used by the present invention.
Figure 4:
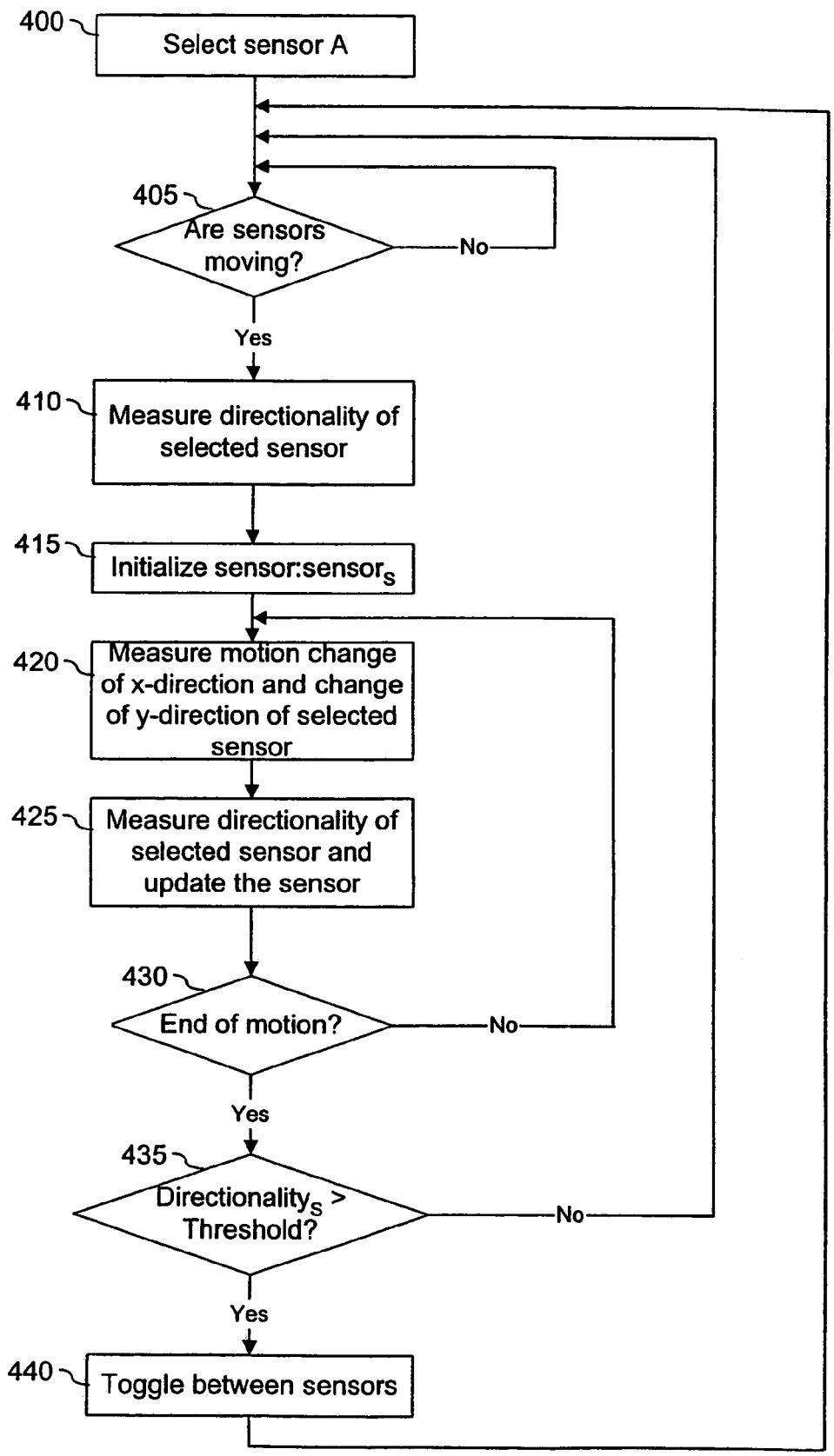
FIG. 4 is a flow diagram illustrating one embodiment of a static process used by the present invention.
Figure 5:
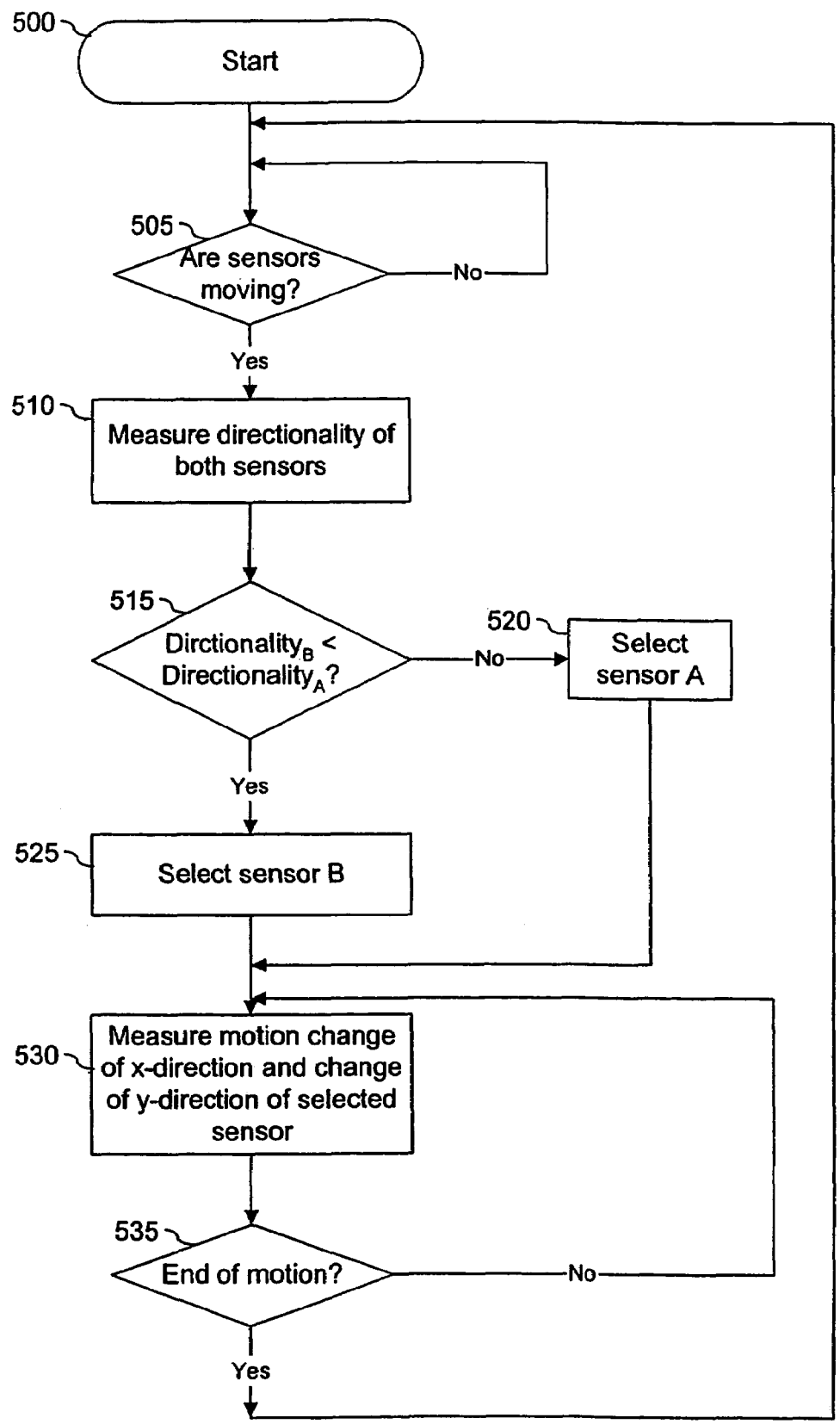
FIG. 5 is a flow diagram illustrating one embodiment of a static process used by the present invention.

FIGS. 3 through 5 show flow charts of three examples of static processes. These figures are not meant to be an inclusive set of static processes. Any static process that increases the accuracy of tracking ability over a single sensor optical device can be used. Additionally, any dynamic process that increases accuracy over a single sensor optical device can also be used. In a static or dynamic process, the motion of the sensors is measured to determine the position of the device in which the sensors are housed. The sensors are fixed within the device and therefore if the motion of the sensors can measure the motion of the device.

Now referring to FIG. 3, there is shown a flow chart illustrating one embodiment of a static process. In this embodiment, the process uses directionality to determine whether to select sensor A 100 or sensor B 105. In one embodiment, the directionality of the sensors can be monitored during the movement of the optical device. When movement stops, the sensor selection can be made based on the lowest directionality value observed during the previous movements.

In one embodiment, a sensor with a fixed time constant is used. The time constant is the amount of time required by the process to accept directionality changes. The time constant is defined by a variable N and a directionality sampling period. In one embodiment, N can be a power of two, for example, 16. The time constant measured in seconds can be obtained by multiplying N with a directionality sampling period. A directionality sampling period is the sampling period for directionality.

In one embodiment, the process arbitrarily selects sensor A initially 300. At the start of movement, the directionality of both sensors can be measured. The process can determine if the sensors are moving 305. If the sensors are not moving, the motion of both sensors can be measured 355, so that it can be determined when the sensors begin movement.

If the sensors are moving, the directionality of both sensors is measured 310 and the sensors are initialized 315. In one embodiment, the sensor initialization involves determining a value for the performance of sensor A and sensor B referred to as $sensor_A$ and $sensor_B$. $sensor_X$, where X can be A or B is determined by multiplying the measured directionality by N, for each sensor. $sensor_X$ is an indication of the tracking ability of sensor X.

$sensor_A = directionality_A$ $sensor_B = directionality_B$

While the sensors are moving, the motion of the selected sensor is measured 320. The motion can be represented as a change in the x-direction and a change in the y-direction on an x-y coordinate system. Also while the sensors are moving, the directionality of both sensors is measured 325 and the sensors are updated 330. The function of updating the sensors can involve updating the values of $sensor_A$ and $sensor_B$ according to the following formulae. In another embodiment, a different formula can be used to update the values of $sensor_A$ and $sensor_B$.

$$sensor_A = \frac{sensor_A * (N-1) + directionality_A}{N}$$

$$sensor_B = \frac{sensor_B * (N-1) + directionality_B}{N}$$

At the end of the motion 335, the $sensor_A$ and $sensor_B$ values are compared to each other 340. If $sensor_B$ is less than $sensor_A$, then sensor B can be selected 350. If $sensor_B$ is not less than $sensor_A$ 340, then sensor A is selected 345. The motion of each sensor is measured 355 until the sensors begin moving 305.

In one embodiment, the directionality sampling rate can be slower than the movement sampling rate. For example, in one embodiment, the movement sampling rate is 200 μs and the directionality sampling rate is 10 ms–200 ms. The sensor time constant can be, for example, 100 ms–2 s, where N is a power of 2 between 1 and 256.

In one embodiment, the selected sensor can be toggled each time the position of the sensors are reported. In this embodiment, the process is dynamic rather than static because the selected sensor can change during movement.

Now referring to FIG. 4, there is shown a flow chart illustrating another embodiment of a static process. In this embodiment also, the process uses directionality to select a sensor. In this embodiment, data from one sensor can be used and continues to be used as long as the selected sensor performance remains satisfactory. When movement stops, sensor selection is toggled if the previously selected sensor's directionality value falls below a threshold value.

To begin, sensor A can be arbitrarily selected 400. At the start of movement 405, the directionality of the selected sensor is measured (directionality$_S$). In the first iteration of this process, the selected sensor will be sensor A and the directionality will be directionality$_A$. The selected sensor is initialized 415. In the initialization process sensors is determined. Sensor S is the selected sensor. Sensor$_S$ is equal to the directionality of sensor S, according to the following equation.

$$sensor_S = directionality_S$$

The motion of the selected sensor can be measured 410. The motion can be represented as a change in the x-direction and change in the y-direction in an x-y coordinate plane. The directionality of the selected sensor is also measured and the sensor is updated 420. Updating a sensor can involve updating the sensor$_S$ value according to the following equation. In another embodiment, a different equation can be used to update the value of sensor$_S$.

$$sensor_S * N = sensors * (N-1) + directionality_S$$

In one embodiment, at the end of the movement 430, if sensor$_S$ is greater than a threshold value 435, then the sensor selection is toggled 440. If sensor$_S$ is not greater than the threshold value 435, the sensor selection remains unchanged. In one embodiment, the threshold value can depend on the directionality data gathered from the sensor.

Now referring to FIG. 5, there is shown a flow chart illustrating another embodiment of a static process. In this embodiment, a sensor is selected at the beginning of each movement. The other sensor is ignored until the end of movement.

In this embodiment, there is no initial sensor selection prior to movement 500. If the sensors are moving 505, the directionality of both sensors is measured 510. If the directionality of sensor B is less than the directionality of sensor A 515, then sensor B is selected 525. If the directionality of sensor B is not less than the directionality of sensor A 515, then sensor A is selected 520. While the sensors are moving, the motion is measured 530. The motion can be represented as a change in the x-direction and a change in the y-direction of an x-y coordinate plane. At the end of movement 530, the motion of both sensors is measured 530. In one embodiment, no action takes place while the sensors are not moving.

Figure 6:
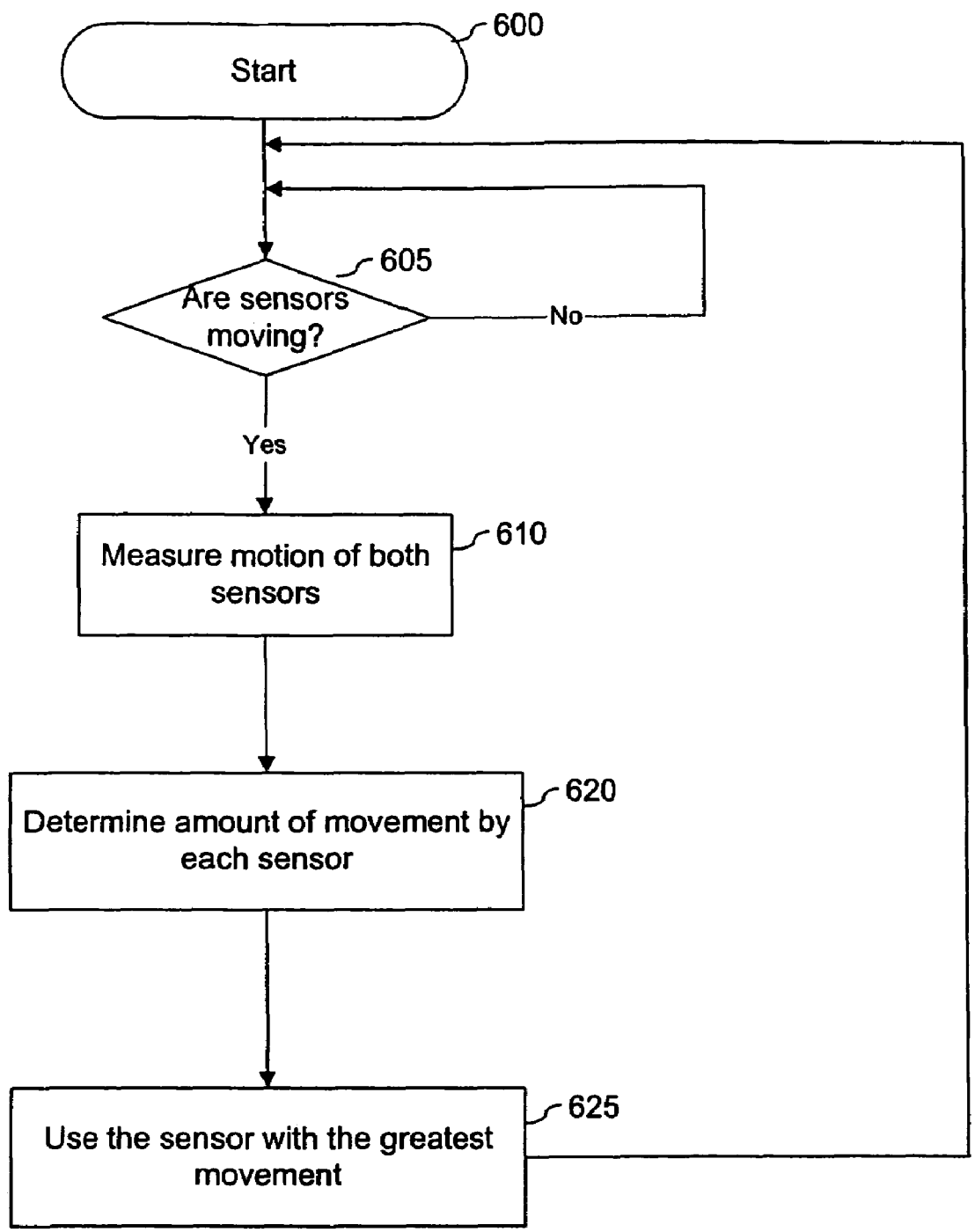
FIG. 6 is a flow diagram illustrating one embodiment of a dynamic process used by the present invention.

Now referring to FIG. 6, there is shown a flow chart illustrating an embodiment of a dynamic process. In this embodiment, while the sensors are moving, motion is acquired. Length of movement can be determined. The sensor with the largest movement is used.

If the sensors are moving 605, then the x-y movement of the sensors is measured 610. In one embodiment, the measured movement by each sensor can be accumulated with each other measured sensor. The amount of movement of each sensor is determined 620. The sensor with the largest movement is used for that particular movement 625. In one embodiment, the movement of sensor B can be rotated back by 45 degrees to take into account a 45 degree angle between the two sensors. In one embodiment, the amount of movement is determined when the sensors are not moving. In another embodiment, the movements can be determined and compared to each other during movement. In that embodiment, the movement could be determined while the sensors are still moving and the sensor with the largest movement could be used as the sensor for that particular movement. In that embodiment, sensor selection can be made during movement.

Figure 7:
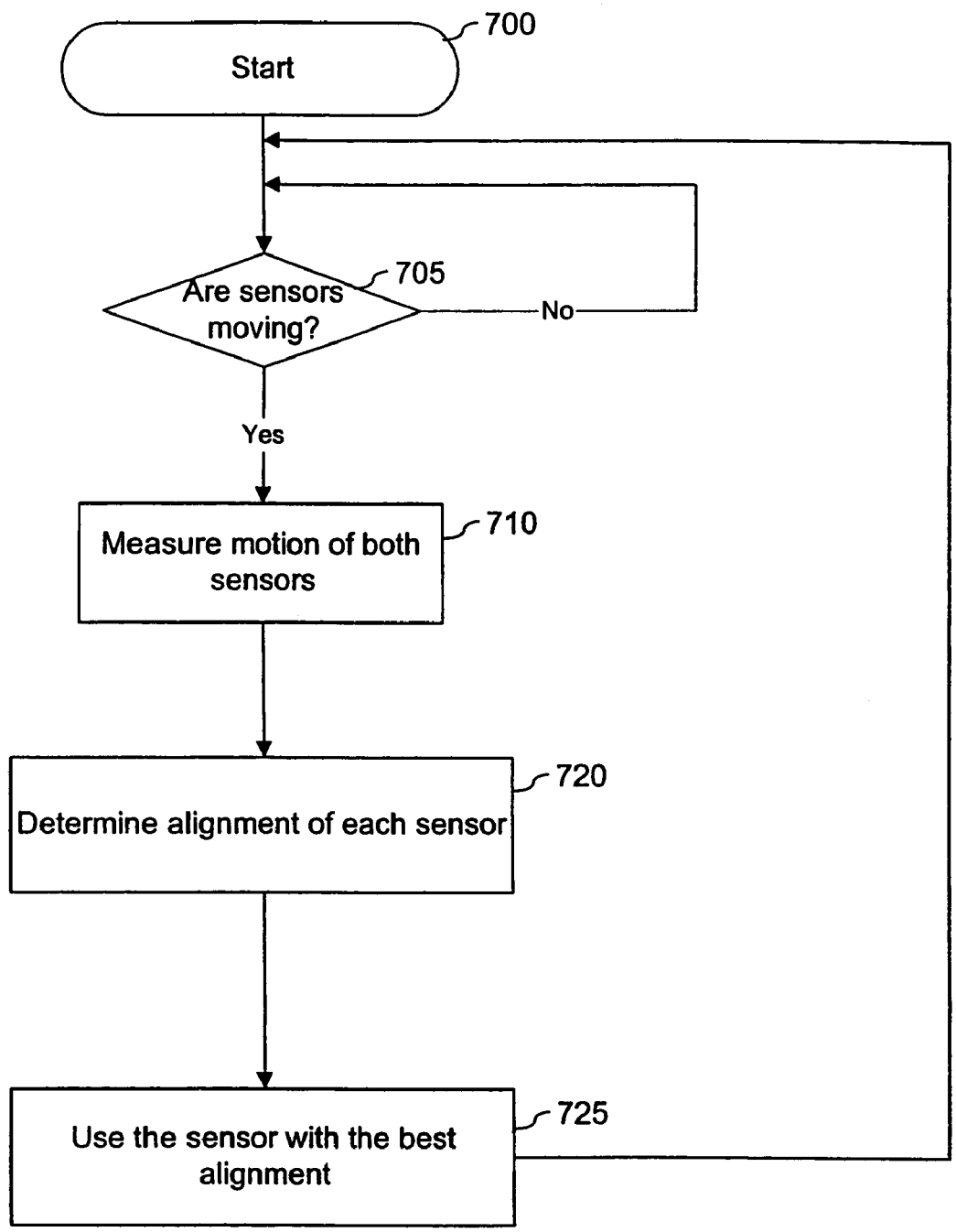
FIG. 7 is a flow diagram illustrating one embodiment of a dynamic process used by the present invention.

Now referring to FIG. 7, there is shown a flow chart illustrating another embodiment of a dynamic process. The dynamic process in this embodiment is similar to the dynamic process shown and described in FIG. 6. The main difference between this embodiment and the embodiment in FIG. 6 is that instead of selecting a sensor based on the distance of movement, the sensor is selected based on alignment. The sensor with the better alignment is used 725. Alignment is determined according to the following equation, where align is alignment, and AXA is the change in motion in the x-direction of sensor A, $\Delta Y_A$ is the change in motion in the y-direction of sensor A, $\Delta X_B$ is the change in motion in the x-direction of sensor B, $\Delta Y_B$ is the change in motion in the y-direction of sensor B:

$$align_A = ||\Delta X_A| - |\Delta Y_A||$$

$$align_B = ||\Delta X_B| - |\Delta Y_B||$$

The sensor with the higher alignment can be chosen and used as the sensor for that particular motion. In one embodiment, the sensor could be selected during the movement of the sensor without waiting for the sensor to stop moving.

Figure 8:
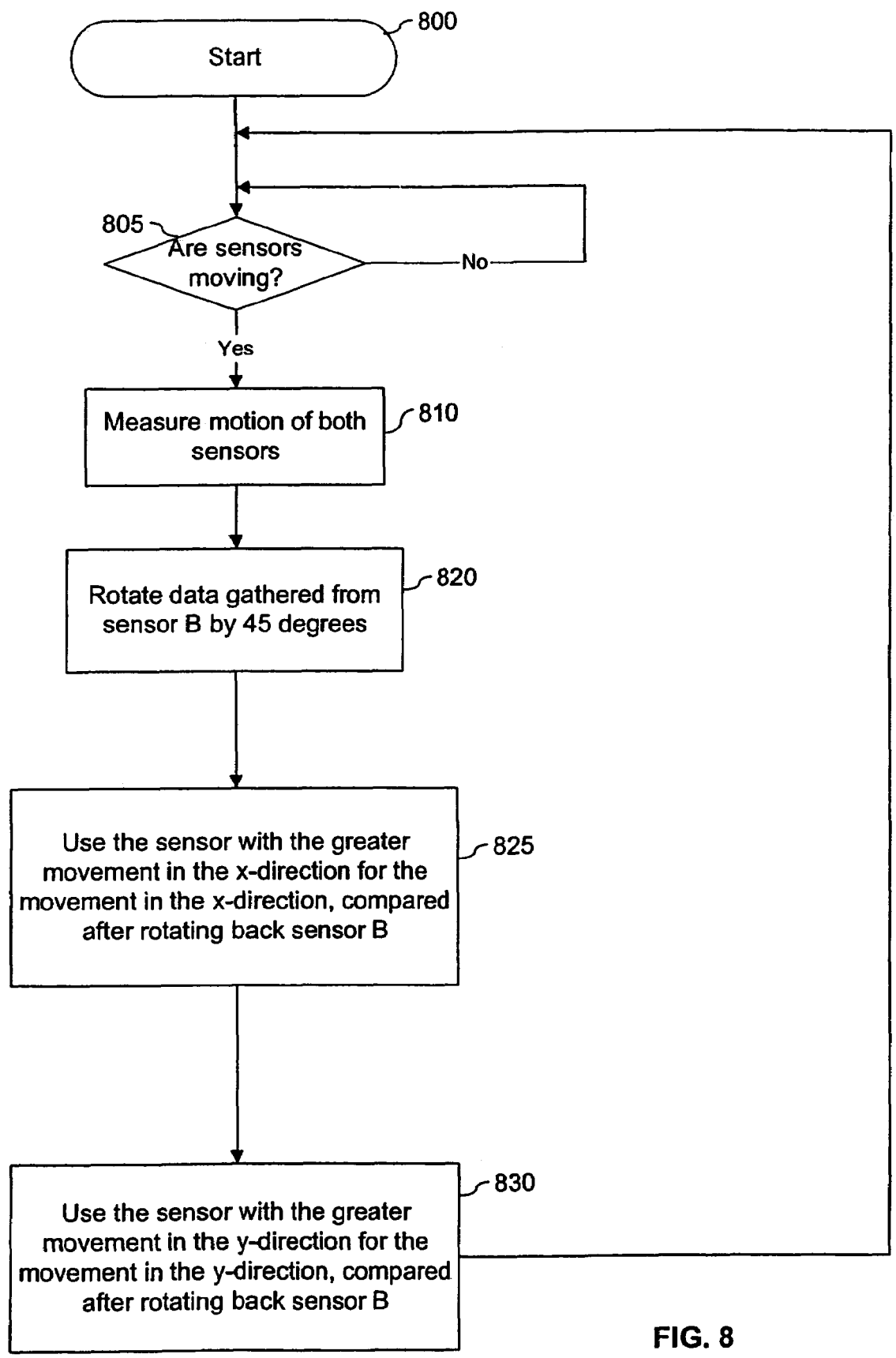
FIG. 8 is a flow diagram illustrating one embodiment of a dynamic process used by the present invention.

Now referring to FIG. 8, there is shown a flow chart illustrating another embodiment of a dynamic process. In this embodiment, motion from both sensors is acquired and combined by selecting the largest values of the change in the x-direction and the change in the y-direction.

At the beginning of movement 805, motion of both sensors is measured 810. In one embodiment, the measured movements can be accumulated by summing all the movements in the x-direction of sensor A and by summing all the movements in the y-direction of sensor A. In this embodiment, the measured movements for sensor B are also accumulated. In one embodiment, the movement data gathered by sensor B can be rotated by 45 degrees to offset the angle difference between sensor A and sensor B 820. In one embodiment, the movement data gathered by sensor B can be rotated back by the angle difference between sensor A and sensor B.

The absolute value of the change in position in the x-direction of sensor A is compared to the absolute value of the change in position in the x-direction of sensor B (with any necessary rotation back included). The greater change in position is used for the change in position in the x direction 825. The absolute value of the change in position in the y-direction of sensor A is compared to the absolute value of the change in position in the y-direction of sensor B (with any necessary rotation back included). The greater change in position is used for the change in position in the y direction 830. In one embodiment, the change in position for the device can be determined while the sensors are moving. In another embodiment, the change in position can be determined while the sensors are not moving.

Figure 9:
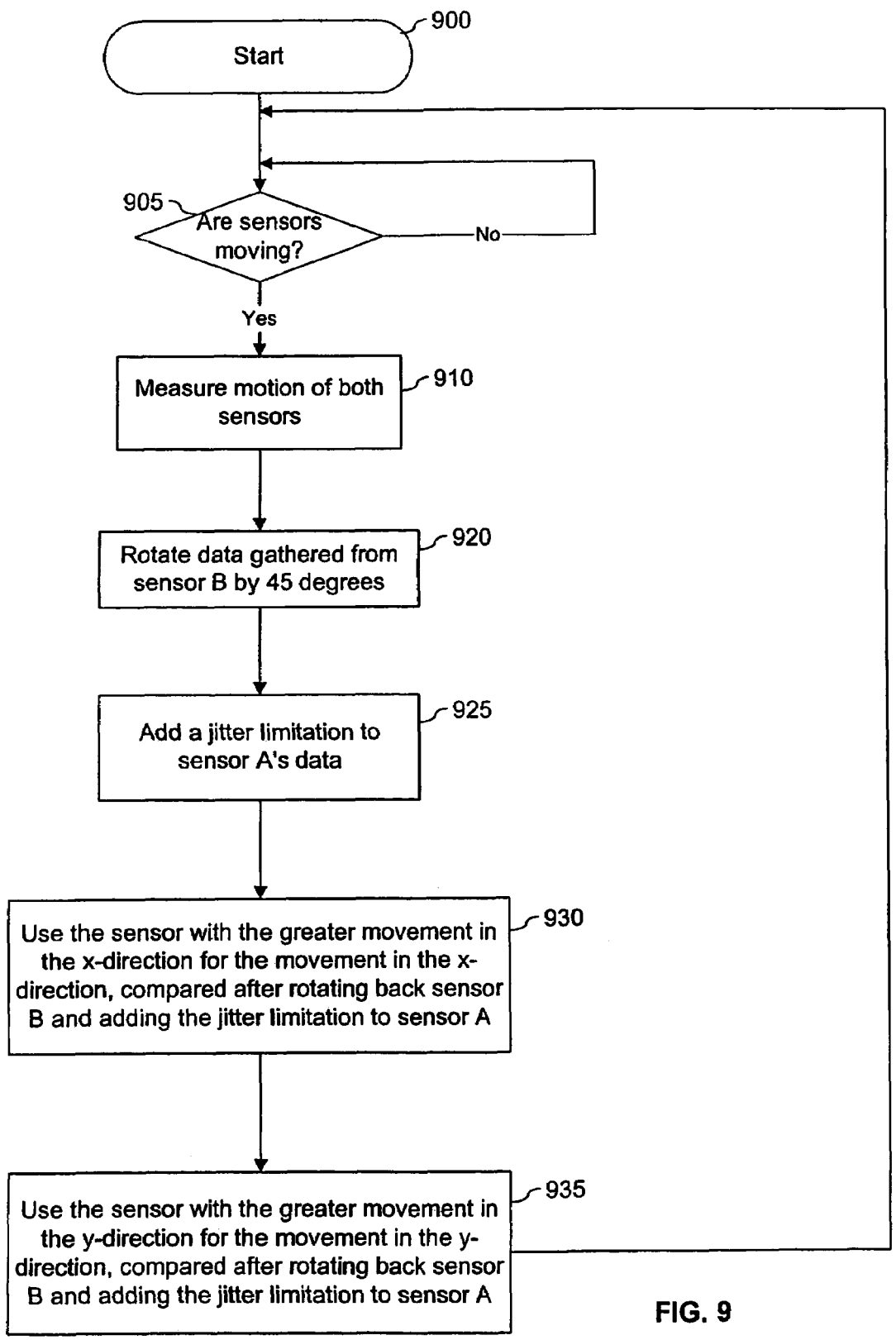
FIG. 9 is a flow diagram illustrating one embodiment of a dynamic process used by the present invention.

Now referring to FIG. 9, there is shown a flow chart illustrating another embodiment of a dynamic process. The dynamic process shown in FIG. 9 is similar to the dynamic process shown and described in FIG. 8.

At the beginning of movement 905, motion of both sensors is measured 910. In one embodiment, the measured movements can be accumulated by summing all the movements in the x-direction of sensor A and by summing all the movements in the y-direction of sensor A. In this embodiment, the measured movements for sensor B are also accumulated. In one embodiment, the movement data gathered by sensor B can be rotated by 45 degrees to offset the angle difference between sensor A and sensor B 920. In one embodiment, the movement data gathered by sensor B can be rotated back by the angle difference between sensor A and sensor B.

A value can be added to at least one of the sensors. In one embodiment, the value is a jitter limitation. A jitter limitation is added to the change in position of sensor A in both the x-direction and the y-direction 925. The change in positions can be compared including any rotation back and the jitter limitation in both the x-direction 930 and the y-direction 935. In this embodiment, a slow movement will only be reported as being measured by sensor A. The jitter limit can be empirically determined for a sensor.

The change in position in the x-direction is determined by the following equation, where $\Delta X_A$ is the change in position for sensor A, $\Delta X_B$ is the change in position for sensor B (including any necessary back rotation), JL is the jitter limit. Use sensor A when:

$$|\Delta X_A| + JL > |\Delta X_B|$$

Otherwise, sensor B is used. The change in position in the y-direction is determined by the following equation, where $\Delta Y_A$ is the change in position for sensor A, $\Delta Y_B$ is the change in position for sensor B (including any necessary back rotation), JL is the jitter limit. Use sensor A when:

$$|\Delta Y_A| + JL > |\Delta Y_B|$$ Otherwise, sensor B is used.

In one embodiment, there are additional benefits to adding a second sensor. On some surfaces one sensor can operate accurately without the use of a second sensor. In such a situation, the second sensor could be used to perform additional functions. In one embodiment, a user may be able to toggle the optical device between single sensor mode and dual sensor mode. For example, a switch operated by a user could set the optical device in either single sensor or dual sensor mode. In dual sensor mode, the system could operate as described above. In one embodiment, in single sensor mode, only one sensor is used for tracking and the other sensor could be used to perform an additional function.

For example, with two sensors the optical device could detect rotation. As an example, in the case of an optical mouse, there is usually no rotation. The mouse is normally used flat against a mouse pad, desk, or other flat surface. If the mouse were to be rotated, the combination of the two sensors could detect rotation. Rotation could indicate a function to be performed by a computer to which the mouse is attached. For example, rotation could indicate to page down or move to the next document. In other embodiments, any other function could also be associated with rotation.

Another example for an additional function is a function performed when one sensor is raised and the other is not. In one embodiment, in the context of an optical mouse, the front of the mouse could be raised, leaving the back of the mouse on a surface. The raising function could indicate to perform an additional function, for example to page down, move to the next document, or any other function.

In one embodiment, the second sensor can be used to detect brightness. Since the second sensor can measure brightness it can be used to detect when the second sensor is on a dark surface or a light surface, for example. When the second sensor is on a dark surface a function could be performed or when the second is on a light surface a function could be performed. In one embodiment, a special mouse pad comprising light portions or dark portions could be constructed such that the second sensor could be over a light or dark portion of the surface for the specified function to occur.

From the above description, it will be apparent that the invention disclosed herein provides a novel and advantageous system and method for sensing in an optical device. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where optical sensing is desirable. Accordingly, the disclosure of the present invention is intended to be illustrative, but not limiting, of the scope of the invention, which is set forth in the following claims.

We claim:

1. An optical assembly in an optical input device, the optical assembly comprising:
    a first optical sensor for providing a first information regarding the relative movement of the optical input device and outputting a first signal corresponding to the first information;
    a second optical sensor, positioned at an angle relative to the first optical sensor, for providing a second information regarding the relative movement of the optical input device and outputting a second signal corresponding to the second information; and
    a multiplexer, configured to receive the first signal and the second signal, the multiplexer for determining the relative movement of the optical input device based on the first and second signals.

2. The optical assembly of claim 1, wherein the angle at which the second optical sensor is positioned relative to the first optical sensor is 45 degrees.

3. The optical assembly of claim 1, wherein the first optical sensor comprises a first lens, the first lens having a first magnification and the second optical sensor comprises a second lens, the second lens having a second magnification.

4. The optical assembly of claim 3, wherein the first magnification is manually switchable.

5. The optical assembly of claim 1, wherein the multiplexer determines the location of the pointing device using the first sensor location.

6. The optical assembly of claim 5, wherein the multiplexer selects the first optical sensor based on a first directionality corresponding to the first optical sensor and a second directionality corresponding to the second optical sensor.

7. The optical assembly of claim 1, wherein the multiplexer determines the location of the optical input device using the second sensor location.

8. The optical assembly of claim 7, wherein the multiplexer selects the second optical sensor based on a first directionality corresponding to the first optical sensor and a second directionality corresponding to the second optical sensor.

9. The optical assembly of claim 1, wherein an optical sensor is selected based on a length of movement of the optical input device determined by at least one optical sensor.

10. The optical assembly of claim 1, wherein an optical sensor is selected based on an alignment of at least one optical sensor.

11. The optical assembly of claim 1, wherein an optical sensor is selected for use in determining motion in an x-direction based on length of movement determined in the x-direction by at least the first optical sensor and the second optical sensor.

12. The optical assembly of claim 11, wherein the optical sensor is selected for use in determining motion in the x-direction based on the length of movement determined and a jitter limitation.

13. The optical assembly of claim 1, wherein an optical sensor is selected for use in determining motion in a y-direction based on a length of movement of the optical input device determined in the y-direction by at least the first optical sensor and the second optical sensor.

14. The optical assembly of claim 13, wherein the optical sensor is selected for use in determining motion in the x-direction based on the length of movement measured and a jitter limitation.

15. The optical assembly of claim 1, wherein the multiplexer determines the location of the optical input device using a combination of the first sensor location and the second sensor location.

16. The optical assembly of claim 1, wherein the optical input device is an optical mouse.

17. The optical assembly of claim 1, wherein the optical input device is a handheld scanner.

18. The optical assembly of claim 1, wherein the optical input device is a printer advance mechanism.

19. The optical assembly of claim 1, wherein the distance between the first optical sensor and the second optical sensor is about 30 millimeters.

20. The optical assembly of claim 1, further comprising a switch for switching the optical input device from a single sensor mode to a multiple sensor mode.

21. The optical assembly of claim 20, wherein in the single sensor mode the second optical sensor causes a function to be performed.

22. The optical assembly of claim 1, further comprising:
a first light source associated with the first optical sensor, the first light source having a first wavelength; and
a second light source associated with the second optical sensor, the second light source having a second wavelength.

23. A method of manufacturing an optical assembly for an optical input device, the method comprising:
inserting a first optical sensor for measuring relative movement of the optical device into the optical assembly;
attaching a second optical sensor for measuring relative movement of the optical device into the optical assembly, the second optical sensor attached at an angle relative to the first optical sensor; and
coupling an output of the first optical sensor and an output of the second optical sensor to a multiplexer for determining a relative movement of the optical input device based on at least one of the output of the first optical sensor and the output of the second optical sensor.

24. The method of claim 23, wherein the angle at which the second optical sensor is attached relative to the first optical sensor is 45 degrees.

25. The method of claim 23, wherein the first optical sensor comprises a first lens, the first lens having a first magnification and the second optical sensor comprising a second lens, the second lens having a second magnification.

26. The method of claim 23, wherein the first optical sensor comprises a first set of lenses, each lens in the first set of lenses having an associated magnification and wherein the second optical sensor comprises a second set of lenses, each lens in the second set of lenses having an associated magnification.

27. A method of manufacturing an optical assembly for an optical input device, the method comprising:
inserting a first optical sensor into the optical assembly;
attaching a second optical sensor into the optical assembly, the second optical sensor attached at an angle relative to the first optical sensor, wherein the first optical sensor comprises a first set of lenses, each lens in the first set of lenses having an associated magnification and wherein the second optical sensor comprises a second set of lenses, each lens in the second set of lenses having an associated magnification; and
coupling an output of the first optical sensor and an output of the second optical sensor to a multiplexer for determining a location of the optical input device based on at least one of the output of the first optical sensor and the output of the second optical sensor;
wherein a first magnification power associated with the first optical sensor is variable by changing a first lens operatively coupled with the first optical sensor with a second lens, the first and second lenses in the first set of lenses comprised by the first optical sensor.

28. The method of claim 27, wherein the first set of lenses are mounted on a carousel system rotatably coupled to the first optical sensor.

29. An optical sensing system in an optical input device; the optical sensing system comprising:
a first optical sensing means for sensing a first sensor location;
a second optical sensing means for sensing a second sensor location, the second sensing means positioned at an angle relative to the first sensing means; and
a determination means for determining a location of the optical input device, the location of the optical input device determined by at least one of the first optical sensing means and the second optical sensing means, wherein the determination means comprises:
a plurality of x-direction measuring means for measuring movement in an x-direction;
a plurality of y-direction measuring means for measuring movement in a y-direction;
a comparing means for comparing each x-direction movement and each y-direction movement;
a first selecting means for selecting an optical sensor with a greatest x-direction movement to measure movement in the x-direction; and
a second selecting means for selecting an optical sensor with a greatest y-direction movement to measure movement in the y-direction.

30. The system of claim 29, further comprising an adding means for adding a value to the movement in the x-direction for at least one optical sensor.

* * * * *

UNITED STATES PATENT AND TRADEMARK OFFICE
CERTIFICATE OF CORRECTION

| | |
|---|---|
| PATENT NO. | : 7,317,448 B1 |
| APPLICATION NO. | : 11/020495 |
| DATED | : January 8, 2008 |
| INVENTOR(S) | : Sasselli et al. |

It is certified that error appears in the above-identified patent and that said Letters Patent is hereby corrected as shown below:

On Drawing Sheet 7 of 11, in Fig. 5 (Reference Numeral 515), line 1, delete "Dirctionality$_B$" and insert -- Directionality$_B$ --, therefor.

In column 2, line 54, delete "mutliplexer" and insert -- multiplexer --, therefor.

In column 5, line 38, delete "an" and insert -- a --, therefor.

In column 7, line 26, before "*(N-1)" delete "sensors" and insert -- Sensor$_S$ --, therefor.

Signed and Sealed this

Twentieth Day of May, 2008

JON W. DUDAS
*Director of the United States Patent and Trademark Office*